(12) United States Patent
Brault

(10) Patent No.: US 7,285,873 B2
(45) Date of Patent: Oct. 23, 2007

(54) INVERTER AND BI-DIRECTIONAL CONVERTER

(75) Inventor: Pierre Brault, 861, 6$^{e0}$ Rang, St-Jude, Quebec (CA) J0H 1P0

(73) Assignee: Pierre Brault, St-Judes, Québec (CA)

( * ) Notice: Subject to any disclaimer, the term of this patent is extended or adjusted under 35 U.S.C. 154(b) by 505 days.

(21) Appl. No.: 10/895,414

(22) Filed: Jul. 21, 2004

(65) Prior Publication Data
US 2006/0017329 A1   Jan. 26, 2006

(51) Int. Cl.
*H02J 1/10* (2006.01)
(52) U.S. Cl. .................................... 307/19
(58) Field of Classification Search .......... 307/19
See application file for complete search history.

(56) References Cited

U.S. PATENT DOCUMENTS 4,661,896 A   4/1987   Kobayashi et al.
6,021,052 A   2/2000   Unger et al.
6,069,804 A   5/2000   Ingman et al.
2005/0040711 A1*   2/2005   West .......................... 307/82

* cited by examiner

*Primary Examiner*—Robert L. DeBeradinis
(74) *Attorney, Agent, or Firm*—Ogilvy Renault, LLP

(57) ABSTRACT

The present invention concerns a device that combines the functionality of an inverter and a bi-directional converter. The device provides, on a number of identical channels, transformation of a DC voltage source of a given level to a filtered DC voltage of another level. The inverter and bi-directional converter of the present invention also has the capability to invert a DC power input to thereby supply, on an AC output, AC power to an AC load, such a fluorescent light. The DC voltage sources at the inputs of inverter and bi-directional converter may act as sources of DC power or sinks of DC power depending on the voltage level of each input and a winding ratio between the channels. Passing from being a source to a sink of DC power is performed smoothly and without interference with the operation of the AC load.

41 Claims, 2 Drawing Sheets

INVERTER AND BI-DIRECTIONAL CONVERTER

CROSS REFERENCE TO RELATED APPLICATIONS

This is the first application filed for the present invention.

FIELD OF THE INVENTION

The present invention relates to the field of electrical inverters and converters. More particularly, the invention deals with inverters and converters having DC power sources and/or loads.

BACKGROUND OF THE INVENTION

In order to achieve DC bi-directional conversion many electrical components must be used. These electrical components are complex, require a large number of parts and hence are costly.

SUMMARY OF THE INVENTION

The present invention concerns a device that combines the functionality of an inverter and a bi-directional converter. The device provides, on a number of identical channels, transformation of a DC voltage source of a given level to a filtered DC voltage of another level. The inverter and bi-directional converter of the present invention also has the capability to invert a DC power input to thereby supply, to an AC output, AC power to an AC load, such as a fluorescent light. The DC voltage sources at the inputs of inverter and bi-directional converter may act as sources of DC power or sinks of DC power (e.g., for recharging) depending on the voltage level of each input and a winding ratio between the channels. The change of the source of DC power from a DC voltage source on one channel to a DC voltage on another channel is performed smoothly and without interference with the operation of the AC load.

In an embodiment, the present invention provides a converter for transforming a DC voltage source into a filtered DC voltage, said converter comprising: a first channel including an input for receiving said DC voltage source, and a first inductor connected to said input for converting said DC voltage source into a DC current source thereby producing AC energy; a second channel including a second inductor; transfer means for transferring said AC energy between said first inductor and said second inductor; and a switching and inverting circuit receiving said DC current source and producing unfiltered DC energy; wherein said second inductor sums said unfiltered DC energy and said transferred AC energy to provide said filtered DC voltage on said second channel.

In another embodiment, the invention provides an inverter and bi-directional converter comprising: at least two converter channels, each of said converter channels comprises an input/output; an inductor; an alternating switch; and a parallel LC circuit; a common inductor core for transferring AC energy, produced by said inductor, to and from each inductor; and a common transformer core for transferring a magnetic field, produced by said LC circuit, to and from each LC circuit; wherein while in an input operation mode: said input/output receives a DC voltage source; said inductor converts said DC voltage source into a DC current source, said inductor produces AC energy that is induced in a common inductor core, said induced AC energy being transferred through said common inductor core to an inductor on another channel, each said inductors being wound on said common inductor core; said alternating switch in combination with said parallel LC circuit produce an AC signal from said DC current source thereby producing said magnetic field; wherein while in an output operation mode: said magnetic field is induced in said parallel LC circuit which produces another AC signal; said alternating switch, acting as a synchronized rectifier, receives said another AC signal to produce unfiltered DC energy; and said unfiltered DC energy is summed with said transferred AC energy to provide a filtered DC voltage source.

In yet another embodiment, the invention provides a multi-source uninterruptible power supply (UPS) for providing power to an AC load, said UPS receiving power from a primary power source and a secondary power source, said primary power source having, in normal operating conditions, a higher voltage value than said secondary power source, said UPS comprising: a DC converter for transitioning from said primary to said secondary power sources when said primary power source decreases below a selected voltage level; and an AC output for producing, from one of said primary and secondary power sources, an output AC signal adapted to drive said AC load.

Still in another embodiment, the invention provides a method for converting a DC voltage source into a filtered DC voltage, said method comprising: receiving and converting said DC voltage source into a DC current, thereby producing AC energy; producing, from said DC current, unfiltered DC energy; and summing said unfiltered DC energy and said AC energy to provide said filtered DC voltage.

BRIEF DESCRIPTION OF THE DRAWING

Further features and advantages of the present invention will become apparent from the following detailed description, taken in combination with the appended drawings, in which.

DETAILED DESCRIPTION

Figure 1:
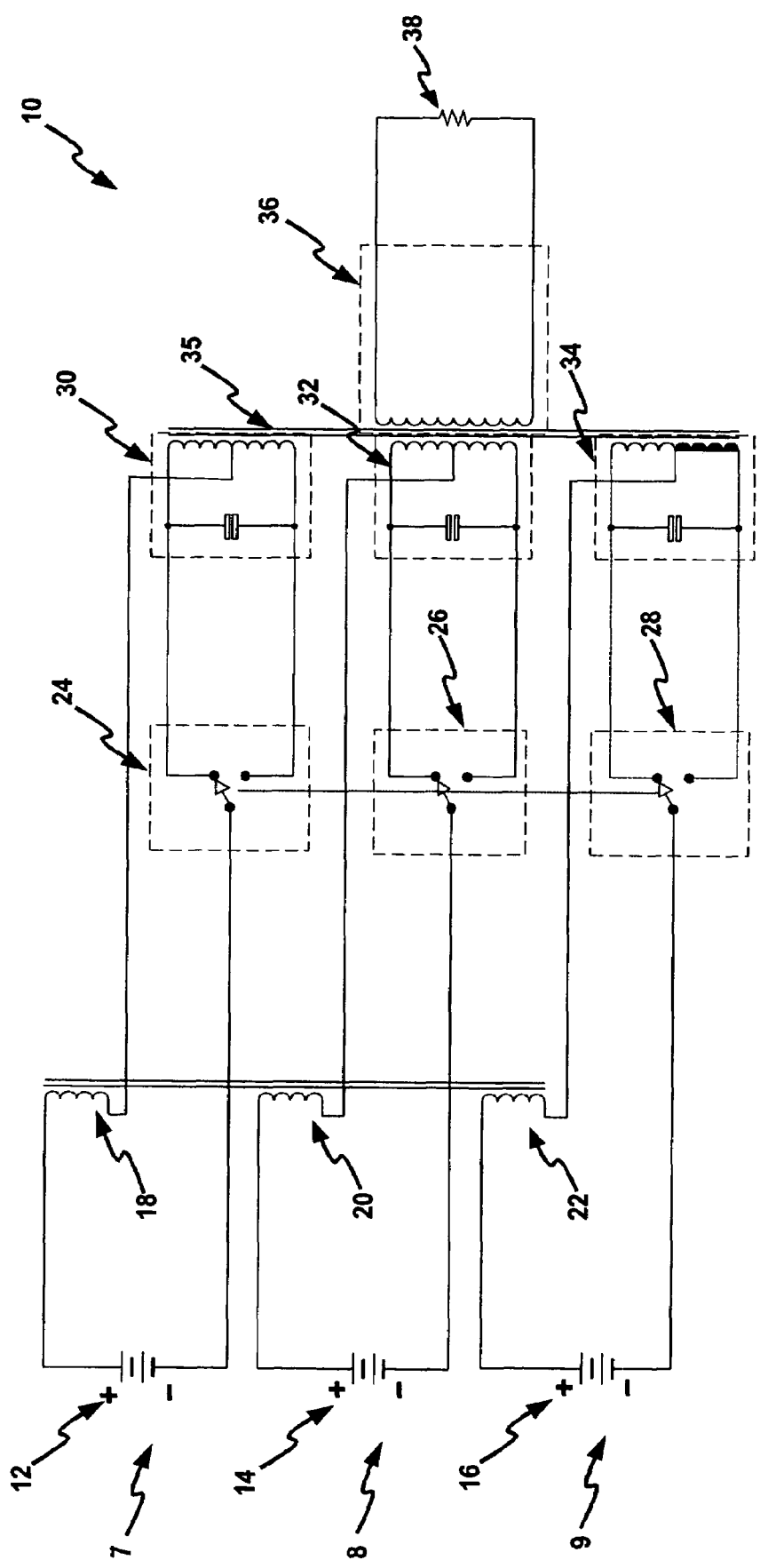
FIG. 1 is a block diagram showing an inverter and bi-directional converter according to an embodiment of the invention.

Referring to FIG. 1, an Inverter and Bi-directional Converter (henceforth referred to as Converter 10) will now be described. Generally, a purpose of Converter 10 is to provide, among other things, a simple device for transforming a DC voltage source 12 at a given input level into a filtered DC voltage 14 of another selected level. At all times, at least one of DC Sources 12, 14, and 16 is a source of DC power while the others may be DC loads. A DC load could be, for example, a rechargeable DC battery. Converter 10 also has the capability to invert a DC input to produce an AC output 36 to thereby supply AC power to a load 38.

Converter 10 is shown having three (3) channels 7, 8 and 9. It is understood that the number of channels could be greater than three. As understood from this description, the minimum number of channels is two, where at least one is acting as a source of power. The number of channels is dictated by the selected application. Each channel (e.g., Channels 7, 8 and 9), comprises an input/output at which is provided a DC source or Load 12, 14 and 16. Each channel further includes an inductor (e.g., Inductors 18, 20 and 22) that converts DC voltage source 12 into a DC current source. In the conversion from a DC voltage to a DC current source, Inductor 18 also produces AC energy.

Converter 10 comprises a transfer means for transferring the AC energy to and from each Inductor 18, 20, 22. In an embodiment of the invention, the transfer means includes Common Inductor Core 23 that is common to all channels and that performs the transfer of AC energy from Inductor 18 to Inductors 20 and 22. The use of AC energy will be further discussed below.

Converter 10 includes a switching and inverting circuit that receives said DC current source and that produces unfiltered DC energy. In an embodiment, switching and inverting circuit comprises at least two alternating switches (e.g., two of Alternating Switches 24, 26, and 28), at least two parallel LC circuits (e.g., two of Parallel LC Circuits 30, 32, and 34) and a Common Transformer Core 35.

In the presently described embodiment, Alternating Switch 24 in combination with Parallel LC Circuit 30 produce, from the DC current source, an AC signal and thereby producing a magnetic field. Common Transformer Core 35 transfers the magnetic field to and from each Parallel LC Circuit 30, 32, and 34.

In this embodiment, the magnetic field is therefore induced from Channel 7 to Channel 8 through Common Transformer Core 35. From the magnetic field, Parallel LC Circuit 32 produces another AC signal. Persons skilled in the art will recognize that the L's (inductors) in LC Circuits 30, 32, and 34 and Common Transformer Core form a transformer. Alternating Switch 26, acting as a synchronized rectifier, receives the other AC signal and produces unfiltered DC energy. The unfiltered DC energy is summed with the previously mentioned transferred AC energy to provide the filtered DC voltage source at the output of Channel 8.

A person skilled in the art will understand that, in the previously described embodiment, Channel 7 is in input operation mode while Channel 8 is in output operation mode.

Also shown on FIG. 1 are: a converter AC Output 36 comprising a coil and an AC Load 38. In an exemplary embodiment, AC load 38 could be one or more fluorescent lights, an AC electric motor, another transformer, or any other AC device.

Finally, Converter 10 may further include synchronizing means (not shown) for synchronizing Alternating Switches 24, 26, and 28 with the resonance frequency of the switching and inverting circuit. The AC signals on each of the channels may thereby be in phase with each other. In an embodiment of the invention, each Alternating Switch 24, 26, and 28 may include a transistor arrangement that provides the necessary synchronized switching function. This type of synchronized switching arrangement is well known to those skilled in the art and will not be further described herein.

Converter 10 automatically and smoothly transitions between DC power sources 12, 14, and 16. This is possible by selecting the appropriate turn ratios for Inductors 18, 20, and 22. Transformer Coil Ratios are conversely selected and calculated. Turn ratios can be calculated according to the selected "Turn On" and "Turn Off" DC voltage levels. The Turn On and Turn Off voltages are used to determine which of the DC voltage sources 12, 14, or 18 will provide the DC power to feed the others and AC output 38. It is understood that the Turn On and Turn Off voltage levels can be a range of values and not necessarily a discrete value thereby ensuring the transition from one channel to another within a window of voltage levels in a gradual manner. Converter 10 differentially transfers the load thereby balancing the energy it requires, within the window of voltage levels, from its respective DC voltage sources. The window is therefore centered on the Turn On and Turn Off voltages.

In Table 1, DC Voltage Source 12 on Channel 1 will act as the source of DC power (first priority) until its voltage level reaches the window centered on 85.0 VDC. At this point, Converter 10 decreases its energy consumption from DC Voltage Source 12 to increase proportionally the energy consumption from DC Voltage Source 14 thereby maintaining constant the energy at AC Output 36 and/or at other outputs of Converter 10. This ensures the smooth transition between sources discussed earlier.

DC Voltage Source 14 on Channel 8 should be at 74.0 VDC and it will takeover as the DC power source until either DC Voltage Source 12 on Channel 7 reaches the bottom of the window centered on 85 VDC or more again, or DC Voltage Source 14 itself drops below the top of the window centered on 50.0 VDC. At that point, DC Voltage Source 16 on Channel 9 will takeover, in the same manner as DC Voltage Source 14 took over above, and act as the source of DC power for AC load 38 until either DC Voltage Source 14 reaches the bottom of the window centered on 50.0 VDC or more again, or DC Voltage Source 16 on itself drops below 6.0 VDC. At this point, if there is not another available channel, the last channel's DC power source will simply completely discharges itself.

Two examples for calculating Transformer and Inductor Coil Ratios are given in Tables 1 and 2 below.

TABLE 1

| Channel Priority | Channel no. | Turn On Voltage (V) | Turn Off Voltage (V) | Transformer and Inductor Coil Ratio (%) |
| --- | --- | --- | --- | --- |
| First | 7 | 120.0 | 85.0 | 100.0 |
| Second | 8 | 74.0 | 50.0 | 87.1 |
| Third | 9 | 7.2 | 6.0 | 8.5 |

TABLE 2

| Channel Priority | Channel no. | Turn On Voltage (V) | Turn Off Voltage (V) | Transformer and Inductor Coil Ratio (%) |
| --- | --- | --- | --- | --- |
| First | 7 | 74.0 | 50.0 | 100.0 |
| Second | 8 | 120.0 | 85.0 | 240.0 |
| Third | 9 | 7.2 | 6.0 | 14.4 |

As can be seen from the examples above, Transformer and Inductor Coil Ratio can be calculated by the following formulae:

(Present Turn On Voltage/Precedent Turn Off Voltage)×100

For example, in Table 1, if the number of turns in Inductor 18 is the reference (100%), the Inductor Coil Ratio to determine the number of turns in Inductor 20 would be calculated as follows:

(74/85)×100=87.1

Furthermore, it will be obvious to persons skilled in the art that DC Voltage Sources 12, 14, or 18 may be selected as a function of the AC Load 38 and/or of the desired time of operation of the AC Load 38.

Figure 2:
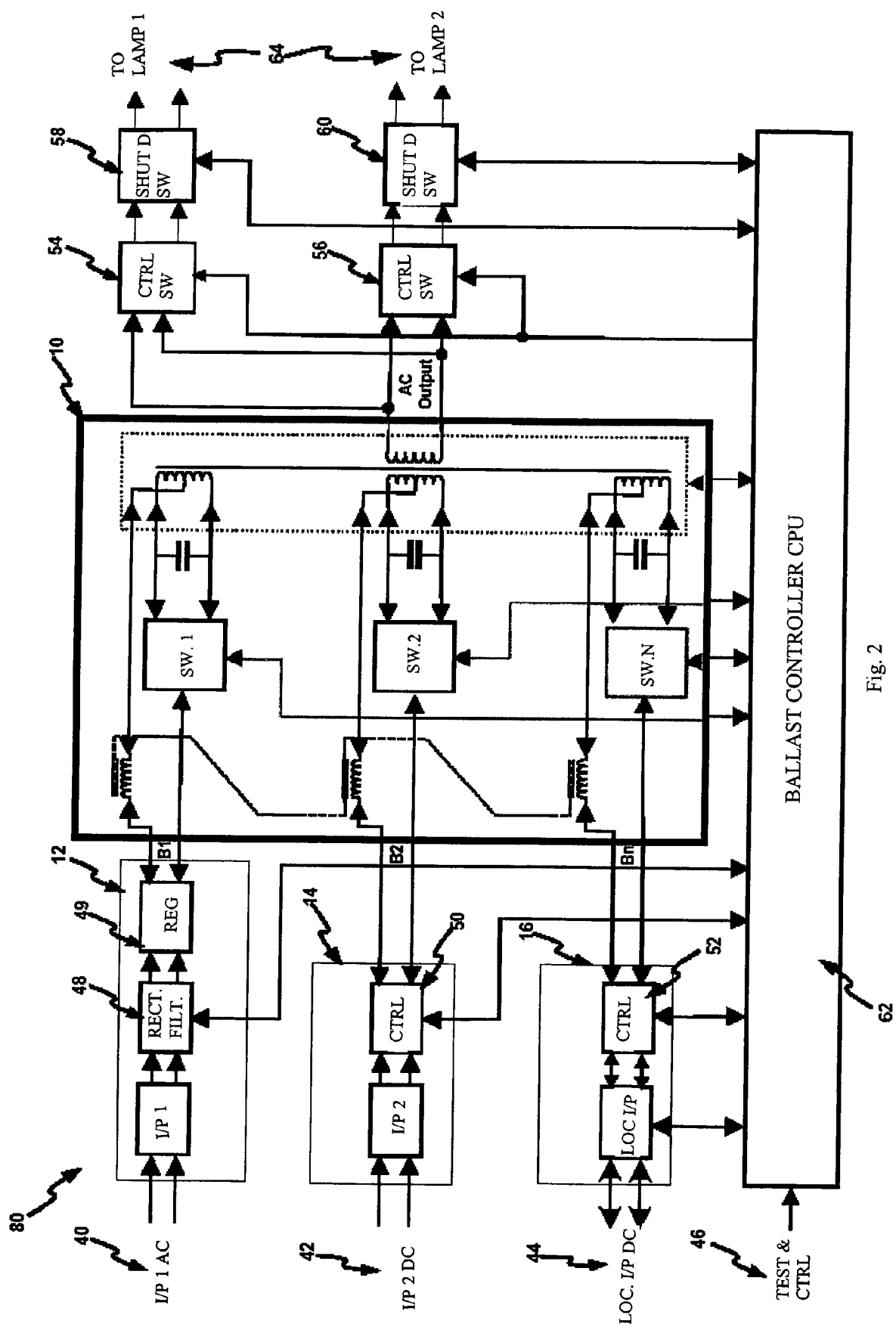
FIG. 2 is a block diagram showing the inverter and bi-directional converter that may be used in a ballast application.

Now referring to FIG. 2, Converter 10 is shown in an emergency lighting ballast application. In this context, a multi-source uninterruptible power supply (UPS) designated by numeral 80 will now be described. In this particular embodiment, the purpose of UPS 80 is to receive electrical power inputs Primary Input 40, Secondary Input 42, and Local Input 44, and to transition between the power sources available to them to eventually provide appropriate power to light a lamp or lamps (e.g., Lamps 64). Lamps 64 include any type of fluorescent lamps, High Intensity Discharge (HID) lamps, etc. UPS 10 also has the capability to recharge the power source at Secondary Input 42 from the power source Primary Input 40, and to recharge the power source at Local Input 44 from the power sources at Secondary Input and/or Primary Input 40. Secondary Input 8 and Local Input 44 can therefore accommodate sinks as well as sources of power. Furthermore, UPS 10 receives Test & Control Signal 46 that is used to advise UPS 10 of a variation in a local condition, such the output of a local battery pack (not shown), or activating only the local battery pack. Operation of UPS 10 may therefore factor in Test & Control Signal 4 into its decision making process.

UPS 10 as shown in the embodiment of FIG. 2 may be used in the context of providing different lighting levels such as would be required in "emergency" conditions. This context would be present, for example, in public transit vehicles (e.g., trains, metros, busses, ferries, aircraft, etc.), in office buildings, multi-family housing, homes, etc. "Emergency" lighting includes lighting provided at the same or lower level as in "normal" conditions, for a given or undetermined period of time (referred to as the emergency period), when a long term source of power is no longer available or intermittent, or when a decrease over time of a primary power source is detected. Details of the requirements for providing "emergency" lighting may be found in legislation and may vary according to each jurisdiction.

Referring back to FIG. 2, UPS 10 as discussed above has three inputs, namely Primary Input 40, Secondary Input 42 and Local Input 44 for electrical power. More specifically, in this embodiment, Primary Input 40 receives an AC power source while Secondary Input 42 and Local Input 44 receive DC power sources.

In this example, Primary Input 40 is converted to a DC power source through Rectifier & Filter Protection Circuit 48 and Power Factor Corrector (PFC) & Voltage Regulator 49. The AC voltage source at Primary Input could be, in this example, 120 VAC. The DC voltage level at the output of PFC & Voltage Regulator 49 could be, for example, at a higher level (i.e., 200VDC) than at Secondary Input 42 (i.e., 74.0 VDC) which itself is at a higher level (i.e., 7.2VDC). Refer to Tables 1 and 2 above for other examples and further details. In an embodiment, Primary Input 40, Secondary Input 42 and Local Input 44 are independent from one another.

Primary Input 40 may be from a central AC power source while Secondary Input 42 may be from a DC battery (e.g., in the range 50VDC to 90VDC). Local Input 44 is normally from a smaller DC battery (e.g., in the range 5VDC to 12VDC).

Controller 10 operates in the same manner as described above. Controller 10 will therefore contribute in determining from which source UPS 80 will drain power to drive lamps 64. The output of Controller 10 will therefore reflect the highest power at its input.

Lamp Level Control blocks 54, 56 receive the AC signal from Converter 10 and introduce an appropriate delay and adjustment in the AC signal under the control of Ballast Controller CPU 62. Lamp Shutdown Switches 58, 60 simply provide the ability to control, from the Ballast Controller CPU 62, the shutting down of a selection from lamps 64.

Finally, Ballast Controller CPU 62 receives inputs from components listed above and performs its functions as discussed earlier. Moreover, Ballast Controller CPU 30 may include a timer for monitoring the period after which Primary Input 40 is not in function.

Persons skilled in the art will understand that when power on Primary Input 40 drops below a given level (refer to examples in Tables 1 and 2), UPS 80 simply draws power from a secondary battery (not shown) at Secondary Input 42.

The embodiment(s) of the invention described above is (are) intended to be exemplary only. The scope of the invention is therefore intended to be limited solely by the scope of the claims to be later appended to the corresponding non-provisional patent application.

The invention claimed is:

1. A converter for transforming a DC voltage source into a filtered DC voltage, said converter comprising:
   a first channel including art input for receiving said DC voltage source, and a first inductor connected to said input for converting said DC voltage source into a DC current source and thereby produce AC energy;
   a second channel including a second inductor;
   transfer means for transferring said AC energy between said first inductor and said second inductor; and
   a switching and inverting circuit receiving said DC current source and producing unfiltered DC energy;
   wherein said second inductor sums said unfiltered DC energy and said transferred AC energy to provide said filtered DC voltage on said second channel.

2. The converter of claim 1, wherein both said first and second channels receive DC voltage sources and, depending on a level of each of said DC voltage sources, one of said first and second channels will supply a source of DC power while the other channel will be a sink of DC power thereby effectively charging said DC voltage source on said other channel.

3. The convener of claim 2, wherein said transfer means comprises a common inductor core that is common to said first and second inductors.

4. The converter of claim 3, wherein said first and second inductors each have a different given number of windings turns around said common inductor core resulting in a winding turn ratio selected to control which of said DC voltage sources will act as said source and said sink.

5. The converter of claim 4, further comprising an AC output and wherein said switching and inverting circuit produces, from said DC current source, an output AC signal on said AC output.

6. The converter of claim 5, wherein said switching and inverting circuit produces a magnetic field and wherein said converter further comprises a common transformer core for transferring said magnetic field between each of said channels and further to said AC output.

7. The converter of claim 6, wherein said AC output comprises an output coil having windings wound around said common transformer core for producing, from said magnetic field, said output AC signal.

8. The converter of claim 6,
   wherein said switching and inverting circuit comprises, for each of said channels, an alternating switch and a parallel LC circuit;
   further wherein, on said source channel, said alternating switch in combination with said parallel LC circuit produces an AC signal from said DC current source and said AC signal is converted to produce said magnetic field; and further wherein, on said sink channel, said magnetic field is induced in said parallel LC circuit which produces another AC signal, and said alternating switch, acting as a synchronized rectifier, receives said another AC signal to produce said unfiltered DC energy.

9. The converter of claim 8, further comprising synchronizing means for synchronizing said alternating switches, said AC signals on each of said channels thereby being in phase with each other.

10. The converter of claim 2, further comprising an AC output and wherein said switching and inverting circuit produces, from said DC current source, an output AC signal on said AC output.

11. The converter of claim 10, wherein said switching and inverting circuit produces a magnetic field and wherein said converter further comprises a common transformer core for transferring said magnetic field between each of said channels and further to said AC output.

12. The converter of claim 11, wherein said AC output comprises an output coil having windings wound around said common transformer core for producing, from said magnetic field, said output AC signal.

13. The converter of claim 11,
wherein said switching and inverting circuit comprises, for each of said channels, an alternating switch and a parallel LC circuit;
further wherein, on said source channel, said alternating switch in combination with said parallel LC circuit produces an AC signal from said DC current source thereby producing said magnetic field; and
further wherein, on said sink channel, said magnetic field is induced in said parallel LC circuit which produces another AC signal, and said alternating switch, acting as a synchronized rectifier, receives said another AC signal to produce said unfiltered DC energy.

14. The converter of claim 13, further comprising synchronizing means for synchronizing said alternating switches, said AC signals on each of said channels thereby being in phase with each other.

15. An inverter and bi-directional converter comprising:
at least two converter channels, each of said converter channels comprises an input/output; an inductor; an alternating switch; and a parallel LC circuit;
a common inductor core for transferring AC energy, produced by said inductor, to and from each inductor; and
a common transformer core for transferring a magnetic field, produced by said LC circuit, to and from each LC circuit;
wherein while in an input operation mode:
said input/output receives a DC voltage source;
said inductor converts said DC voltage source into a DC current source, said inductor produces AC energy that is induced in a common inductor core, said induced AC energy being transferred through said common inductor core to an inductor on another channel, each said inductors being wound on said common inductor core;
said alternating switch in combination with said parallel LC circuit produce an AC signal from said DC current source, and said AC signal is converted to produce said magnetic field;
wherein while in an output operation mode:
said magnetic field is induced in said parallel LC circuit which produces another AC signal;
said alternating switch, acting as a synchronized rectifier, receives said another AC signal to produce unfiltered DC energy; and
said unfiltered DC energy is summed with said transferred AC energy to provide a filtered DC voltage source.

16. The inverter and bi-directional converter of claim 15, wherein said channels receive DC voltage sources and, depending on a level of each of said DC voltage sources, one of said channels will act as a source of power while another channel will act a sink thereby effectively charging said DC voltage source on said another channel.

17. The inverter and bi-directional converter of claim 16, wherein said first and second inductors each have a different given number of windings turns around said common inductor core resulting in a winding turn ratio selected to control which of said DC voltage sources will act as said source and said sink.

18. The inverter and bi-directional converter of claim 17, further comprising an AC output and wherein said switching and inverting circuit produces an AC signal on said AC output.

19. The inverter and bi-directional converter of claim 18, wherein said AC output comprises an output coil having windings wound around said common transformer core for producing, from said magnetic field, said output AC signal.

20. A multi-source uninterruptible power supply (UPS) for providing power to an AC load, said UPS receiving power from a primary power source and a secondary power source, said primary power source having, in normal operating conditions, a higher voltage value than said secondary power source, said UPS comprising:
a DC converter for transitioning from said primary to said secondary power sources when said primary power source decreases below a selected voltage level;
an AC output for producing, from one of said primary and secondary power sources, an output AC signal adapted to drive said AC load; and
a controller receiving a control signal indicative of a decrease in a variation of said higher voltage value over time, wherein said controller controls a level of lighting of said lamp in dependence of the state of said control signal,
wherein said primary power source comprises an AC power source and said UPS further comprises means for said AC power source to a DC voltage source, and
wherein said DC converter comprises:
a first channel including an input for receiving said DC voltage source, and a first inductor connected to said input for converting said DC voltage source into a DC current source thereby producing AC energy;
a second channel including a second inductor;
transfer means for transferring said AC energy between said first inductor and said second inductor; and
a switching and inverting circuit receiving said DC current source and producing unfiltered DC energy; and
wherein said second inductor sums said unfiltered DC energy and said transferred AC energy to provide said filtered DC voltage on said second channel.

21. The UPS of claim 20, wherein both said first and second channels receive DC voltage sources and, depending on a level of each of said DC voltage sources, one of said first and second channels will supply a source of DC power while the other channel will be a sink of DC power thereby effectively charging said DC voltage source on said other channel.

22. The UPS of claim 21, wherein said transfer means comprises a common inductor core that is common to said first and second inductors.

23. The UPS of claim 22, wherein said first and second inductors each have a different given number of windings turns around said common inductor core resulting in a winding turn ratio selected to control which of said DC voltage sources will act as said source and said sink.

24. The UPS of claim 23, further comprising an AC output and wherein said switching and inverting circuit produces, from said DC current source, an output AC signal on said AC output.

25. The UPS of claim 24, wherein said switch and inverter circuit produces a magnetic field and wherein said further comprises a common transformer core for transferring said magnetic field between each of said channels and further to said AC output.

26. The UPS of claim 25, wherein said AC output comprises an output coil having windings wound around said common transformer core for producing, from said magnetic field, said output AC signal.

27. The UPS of claim 25,
wherein said switching and inverting circuit comprises, for each of said channels, an alternating switch and a parallel LC circuit;
further wherein, on said source channel, said alternating switch in combination with said parallel LC circuit produces an AC signal from said DC current source and said AC signal is convened to produce said magnetic field; and
further wherein, on said sink channel, said magnetic field is induced in said parallel LC circuit which produces another AC signal, and said alternating switch, acting as a synchronized rectifier, receives said another AC signal to produce said unfiltered DC energy.

28. The UPS of claim 27, further comprising synchronizing means for synchronizing said alternating switches, said AC signals on each of said channels thereby being in phase with each other.

29. The UPS of claim 21, further comprising an AC output and wherein said switching and inverting circuit produces, from said DC current source, an output AC signal on said AC output.

30. The UPS of claim 29, wherein said switch and inverter circuit produces a magnetic field and wherein said further comprises a common transformer core for transferring said magnetic field between each of said channels and further to said AC output.

31. The UPS of claim 30, wherein said AC output comprises an output coil having windings wound around said common transformer core for producing, from said magnetic field, said output AC signal.

32. The UPS of claim 30,
wherein said switching and inverting circuit comprises, for each of said channels, an alternating switch and a parallel LC circuit;
further wherein, on said source channel, said alternating switch in combination with said parallel LC circuit produces an AC signal from said DC current source and said AC signal is converted to produce said magnetic field; and
further wherein, on said sink channel, said magnetic field is induced in said parallel LC circuit which produces another AC signal, and said alternating switch, acting as a synchronized rectifier, receives said another AC signal to produce said unfiltered DC energy.

33. The UPS of claim 29, further comprising synchronizing means for synchronizing said alternating switches, said AC signals on each of said channels thereby being in phase with each other.

34. A multi-source uninterruptible power supply (UPS) for providing power to an AC load, said UPS receiving power from a primary power source and a secondary power source, said primary power source having, in normal operating conditions, a higher voltage value than said secondary power source, said UPS comprising:
a DC converter for transitioning from said primary to said secondary power sources when said primary power source decreases below a selected voltage level;
an AC output for producing, from one of said primary and secondary power sources, an output AC signal adapted to drive said AC load;
a controller receiving a control signal indicative of a decrease in a variation of said higher voltage value over time, wherein said controller controls a level of lighting of said lamp in dependence of the state of said control signal; and
further comprising an inverter and bi-directional converter comprising:
at least two converter channels, each of said of said converter channels comprises an input/output; an inductor; an alternating switch; and a parallel LC circuit;
a common inductor core for transferring AC energy, produced by said inductor, to and from each inductor; and
a common transformer core for transferring a magnetic field, produced by said LC circuit, to and from each LC circuit;
wherein while in an input operation mode:
said input/output receives a DC voltage source;
said inductor converts said DC voltage source into a DC current source, said inductance produces AC energy that is induced in a common inductor core, said induced AC energy being transferred to each inductance on another channel and wound on said common inductor core;
said alternating switch in combination with said parallel LC circuit produces an AC signal from said DC current source, and said AC signal is convened to produce said magnetic field;
wherein while in an output operation mode:
said magnetic field is induced in said parallel LC circuit which produces another AC signal;
said alternating switch, acting as a synchronized rectifier, receives said another AC signal to produce unfiltered DC energy; and
said unfiltered DC energy is summed with said transferred AC energy to provide a filtered DC voltage source, and
wherein said primary power source comprises an AC power source and said UPS further comprises means for said AC power source to a DC voltage source.

35. The UPS of claim 34, wherein said channels receive DC voltage sources and, depending on a level of each of said DC voltage sources, one of said channels will act as a source of power while another channel will act a sink thereby effectively charging said DC voltage source on said another channel.

36. A method for converting a DC voltage source into a filtered DC voltage, said method comprising:
receiving and converting said DC voltage source into a DC current, thereby producing AC energy;
producing, from said DC current, unfiltered DC energy;
summing said unfiltered DC energy and said AC energy to provide said filtered DC voltage; and
receiving another DC voltage source and determining, depending on a level of each of said DC voltage sources, which of said DC voltage sources will be a source of DC power while the other DC voltage source will be a sink of DC power thereby effectively charging said other DC voltage source, wherein said receiving and converting occurs on a first channel, and said summing occurs on a second channel, the method further comprising transferring said AC energy from said first channel to said second channel.

37. The method of claim 36, further comprising producing, from said DC current, an AC output signal on an AC output.

38. The method of claim 37, further comprising producing a magnetic field from said DC current.

39. The method of claim 38, further comprising transferring said magnetic field between each of said channels and further to said AC output.

40. The method of claim 39,
further wherein, on said source channel, producing an AC signal from said DC current source and converting said AC signal to produce said magnetic field; and
further wherein, on said sink channel, using said magnetic field to produce another AC signal, and synchronously rectifying said another AC signal to produce said unfiltered DC energy.

41. The method of claim 40, further comprising synchronizing said AC signals on each of said channels to thereby produce AC signals that are in phase with each other.

* * * * *